Oct. 9, 1956   O. D. BLOSSER   2,765,774
NOSTRIL ATTACHED CALF AND COW WEANER
Filed Sept. 27, 1955   2 Sheets-Sheet 1
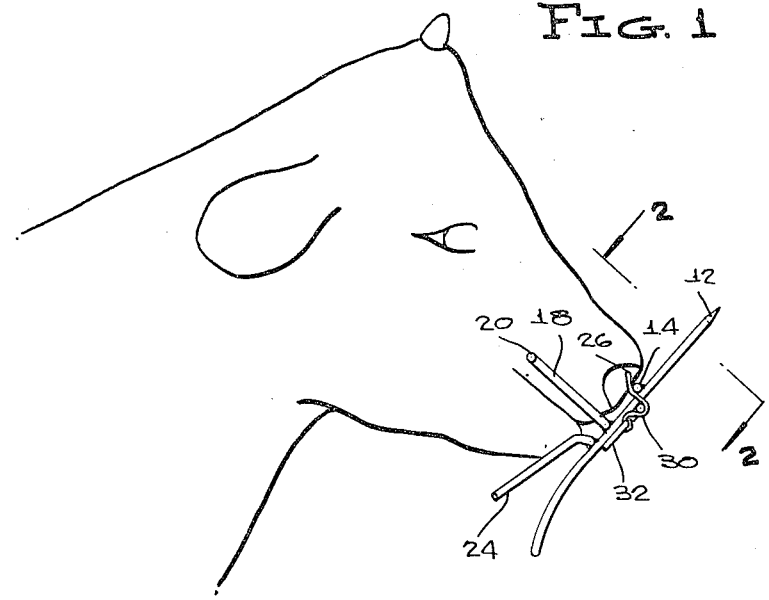
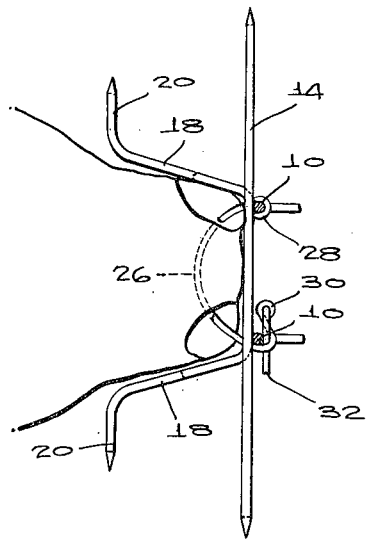
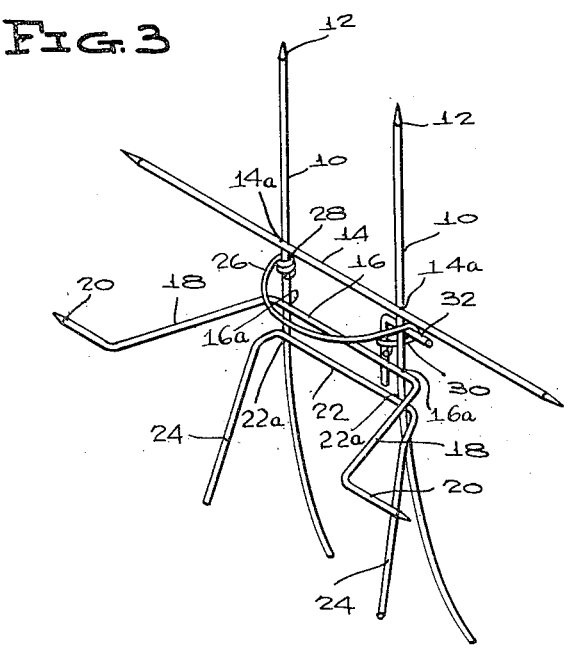
INVENTOR.
OREN D. BLOSSER
BY
McMorrow, Berman + Davidson
ATTORNEYS Oct. 9, 1956        O. D. BLOSSER        2,765,774
NOSTRIL ATTACHED CALF AND COW WEANER
Filed Sept. 27, 1955        2 Sheets-Sheet 2
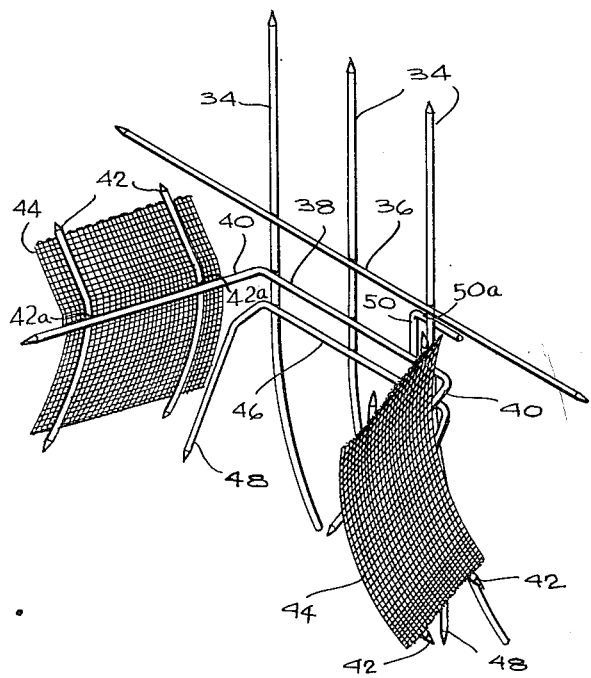
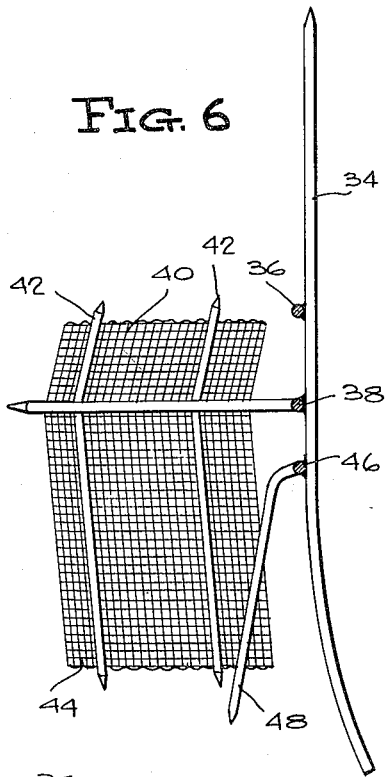
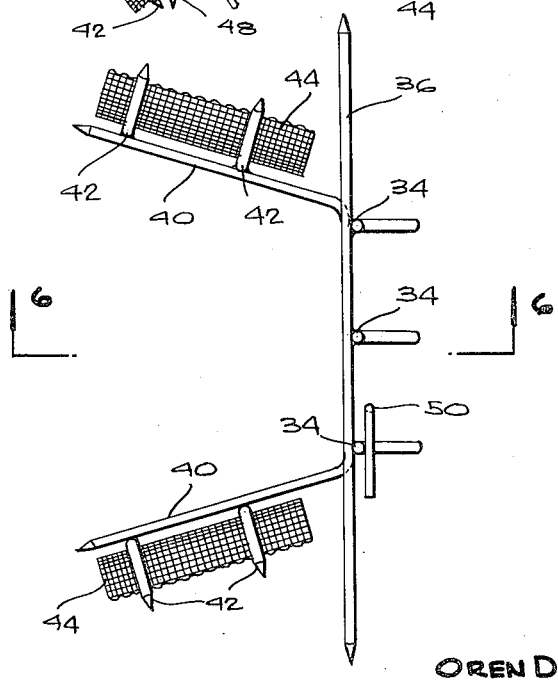
INVENTOR.
OREN D. BLOSSER
BY
McMorrow, Berman + Davidson
ATTORNEYS United States Patent Office 2,765,774
Patented Oct. 9, 1956

2,765,774

NOSTRIL ATTACHED CALF AND COW WEANER

Oren D. Blosser, South English, Iowa

Application September 27, 1955, Serial No. 536,822

6 Claims. (Cl. 119—132)

This invention relates to a weaner for calves and cows and more particularly has reference to a weaner which, in various forms of the invention, will prevent calves from sucking heifers that have not freshened, cows that are milking, and cows that suck themselves.

Summarized briefly, the invention comprises a weaner of wire material having a hinged attaching loop extendable through the nose tissue, and a frame comprising crossed bars sharply tipped to provide points at the sides and top of the frame so disposed as to prick the animal approched. In all forms of the invention some of the points are offset rearwardly from the general plane of the frame and in some forms, mesh screens are employed at the sides to prevent side nursing. Further, in each instance the frame has an open front that will permit feeding and grazing without interference from the weaner.

Among important objects of the invention are the following:

To insure to the maximum extent easy feeding or grazing by the animal;

To insure maximum safety for other animals due to the absence of any forwardly projecting, sharp points;

To prevent side nursing;

To facilitate the attachment and removal of the device while maintaining its full adaptability for re-use; and To provide a weaner that will be light in weight and yet rugged while still being capable of manufacture at low cost.

Other objects will appear from the following description, the claims appended thereto, and from the annexed drawing, in which like reference characters designate like parts throughout the several views, and wherein:

Figure 1 is a side elevational view of the weaner in use;

Figure 2 is an enlarged sectional view on line 2—2 of Figure 1;

Figure 3 is an enlarged rear perspective view of the device;

Figure 4 is a rear perspective view of a modified construction;

Figure 5 is a top plan view of the modified form of the device shown in Figure 4; and Figure 6 is a section on line 6—6 of Figure 5.

In the form of the invention shown in Figures 1–3, the device includes a pair of laterally spaced, parallel rods 10 of stiff wire material extending in an up and down direction and formed at their upper ends with sharpened tips 12. The lower ends of the rods are curved forwardly to a slight extent.

Welded as at 14a to the intermediate portions of the rods 10 is an upper cross member 14 having sharply tipped ends projecting laterally in opposite directions beyond the rods 10. An intermediate cross member 16 is welded as at 16a to the rods and has rearwardly diverging end portions 18 terminating in outwardly projecting, pointed tips 20 paralleling the member 14.

A lower cross member 22 is welded as at 22a to the rods 10 and is formed with rearwardly diverging end portions 24 inclined downwardly from the rods 10. The portions 18, 24 extend along opposite sides of the calf's or cow's nose, and as will be noted, the several cross members and rods 10 cooperate to define a frame through which the animal may feed or graze without difficulty.

An attaching loop 26 formed from a length of noncorrosive, bendable wire is coiled as at 28 at one end about one of the rods 10 and has its other end 30 looped about a connecting rod 32 of inverted L-shape welded to the other rod 10. The connecting rod is extended through the nose tissue of the annimal, as shown in Figure 2.

In Figures 4–6 a second form of the invention is shown, which in a smaller size is used on calves that suck cows that have freshened and in a larger size, on cows that suck themselves. In this form, there are three parallel rods 34 extending in an up and down direction, and secured to these is an upper, transversely disposed cross member 36. A middle cross member 38 is secured to the rods below the member 36 and has rearwardly divergent, sharply tipped end portions 40 to which are welded as at 42a the apex portions of V-shaped side rods 42 pointed at their ends. A wire mesh screen 44 is secured to each pair of side rods and terminates at its upper and lower ends short of the points of the side rods.

A lower cross member 36 has rearwardly divergent end portions 48 spaced inwardly from the screens and inclined downwardly away from the rods 34. A keeper or connecting bar 50 similar to the bar 32 is welded as at 50a to one of the rods 34.

In this form of the invention as in the first form, feeding or grazing is permitted without difficulty, since no points project forwardly of the plane of the frame defined by the upper portions of rods 34 and the intermediate portions of the several cross members.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A calf and cow weaner comprising a plurality of rods extending in an up and down direction, and having pointed tips at their upper ends; and a plurality of cross members fixedly connected to said rods and formed with pointed tips projecting laterally, rearwardly from the rods, said cross members including an upper cross member having its length normal to the lengths of the rods, a middle cross member having end portions diverging rearwardly from the rods, and a lower cross member also having end portions diverging rearwardly from the rods.

2. A calf and cow weaner comprising a plurality of rods extending in an up and down direction, and having pointed tips at their upper ends; and a plurality of cross members fixedly connected to said rods and formed with pointed tips projecting laterally, rearwardly from the rods, said cross members including an upper cross member having its length normal to the lengths of the rods, a middle cross member having end portions diverging rearwardly from the rods, and a lower cross member also having end portions diverging rearwardly from the rods, the end portions of the lower cross member declining in a direction away from the rods.

3. A calf and cow weaner comprising a plurality of rods extending in an up and down direction, and having pointed tips at their upper ends; a plurality of cross members fixedly connected to said rods and formed with pointed tips projecting laterally, rearwardly from the rods; and a connecting loop for extension through the nose tissue of an animal and hinged at one end on one of said rods.

4. A calf and cow weaner comprising a plurality of rods extending in an up and down direction, and having pointed tips at their upper ends; a plurality of cross members fixedly connected to said rods and formed with pointed tips projecting laterally, rearwardly from the rods; a connecting loop for extension through the nose tissue of an animal and hinged at one end on one of said rods; and a keeper secured to a second rod, the connecting loop being bendable about said keeper.

5. A calf and cow weaner comprising a plurality of rods extending in an up and down direction, and having pointed tips at their upper ends; a plurality of cross members fixedly connected to said rods and formed with pointed tips projecting laterally, rearwardly from the rods, said cross members including an upper cross member having its length normal to the lengths of the rods, a middle cross member having end portions diverging rearwardly from the rods, and a lower cross member also having end portions diverging rearwardly from the rods; and a plurality of V-shaped, outwardly projecting side rods secured at their apices to the end portions of the middle cross member and having pointed ends.

6. A calf and cow weaner comprising a plurality of rods extending in an up and down direction, and having pointed tips at their upper ends; a plurality of cross members fixedly connected to said rods and formed with pointed tips projecting laterally, rearwardly from the rods, said cross members including an upper cross member having its length normal to the lengths of the rods, a middle cross member having end portions diverging rearwardly from the rods, and a lower cross member also having end portions diverging rearwardly from the rods; a plurality of V-shaped, outwardly projecting side rods secured at their apices to the end portions of the middle cross member and having pointed ends; and wire mesh screens secured to said side rods and V-shaped in cross section, said screens having their upper and lower ends terminating short of the tips of the side rods.

References Cited in the file of this patent
UNITED STATES PATENTS

| | | |
|---|---|---|
| 194,594 | Fuller | Aug. 28, 1877 |
| 240,284 | Taylor et al. | Apr. 19, 1881 |
| 261,096 | Jones et al. | July 11, 1882 |
| 380,796 | Fuller et al. | Apr. 10, 1888 |
| 2,703,555 | Anderson | Mar. 8, 1955 |